Aug. 31, 1926.
C. A. SKINNER
1,598,159
POULTRY ROOST
Filed Feb. 27, 1925
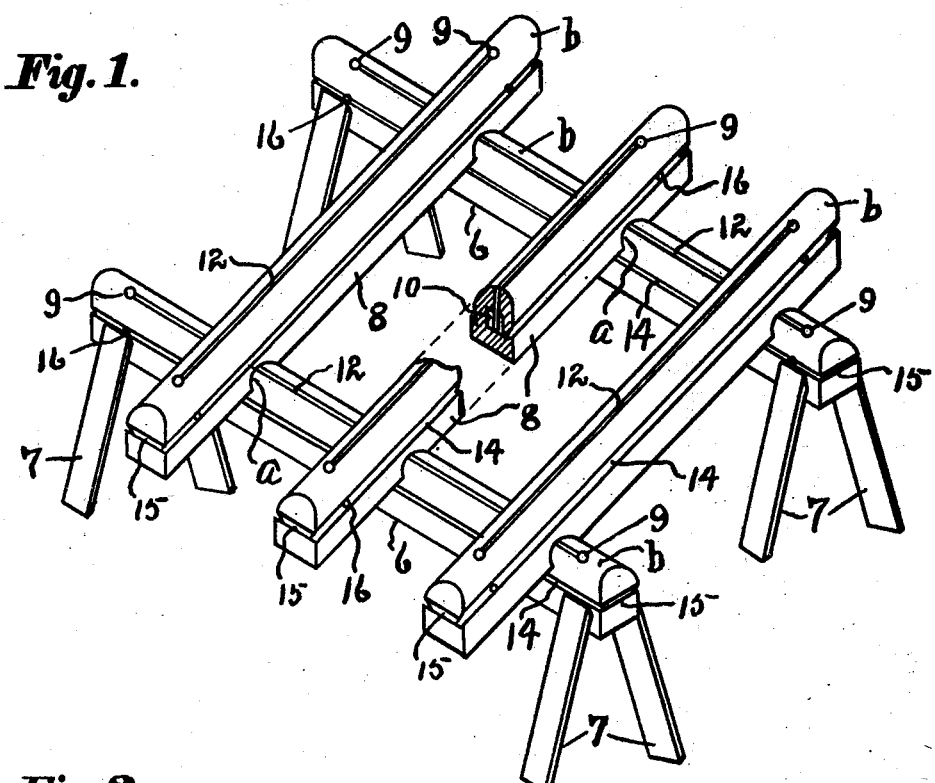
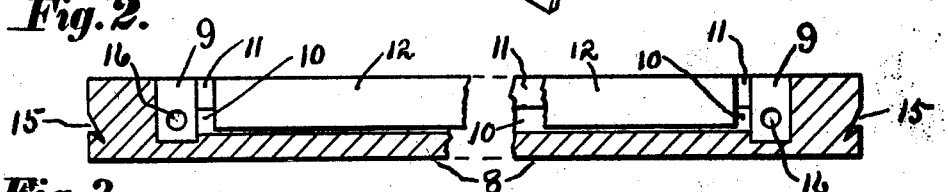
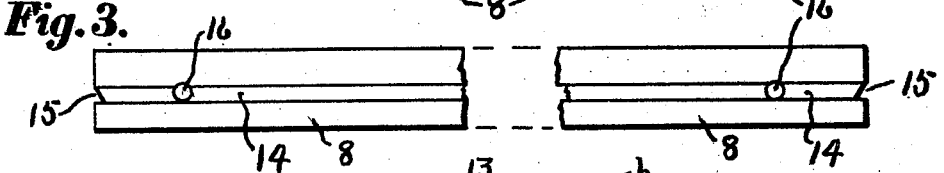
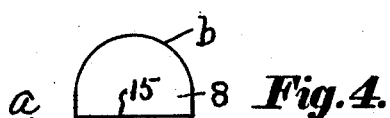
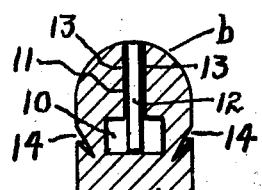
Inventor
C. A. Skinner.
By Arthur H. Sturges
Attorney Patented Aug. 31, 1926.                                    1,598,159

UNITED STATES PATENT OFFICE.

CLARENCE A. SKINNER, OF COUNCIL BLUFFS, IOWA.

POULTRY ROOST.

Application filed February 27, 1925. Serial No. 11,951.

This invention relates to an improved poultry roost, and has for its object to provide medicinally treated perches of such construction that vermin will be excluded, whereby the poultry, while roosting, will be protected.

The invention broadly includes a plurality of perches, each being provided with a channel formed longitudinally therein approximately midway between its sides to terminate adjacent to its ends, said channel being in communication with a slot opening on the top of the perch, and thereby providing a container adapted to be filled with a certain liquid mixture which is repellent to vermin, the result being that the mixture thus deposited, and which will be absorbed by the perch, will operate as a "safety bridge" over which vermin will not pass, and that poultry while on the perches will be protected.

The invention also includes the provision of passageways leading upwardly from the channel to the upper surface of the perch, said passageways being formed at the sides of a filler-strip which is inserted in the slot and tending to facilitate a movement of the mixture to said upper surface; also it includes intake reservoirs at the ends of the channels for containing the liquid mixture and for use when filling the channels; also the invention includes communicating conduits formed in the sides and ends of the perches for containing said mixture, and includes a roost having base-strips or sills which are provided with the channels, reservoirs and conduits mentioned.

With the foregoing objects in view and others to be mentioned, the invention presents a novel and useful construction, combination and arrangement of parts as described herein and claimed, and as illustrated in the accompanying drawing, it being understood that changes may be made in form, size, proportion and minor details, said changes being within the scope of the invention as claimed.

In the drawing, Fig. 1 is a broken away, perspective view of a poultry roost embodying the invention. Fig. 2 is a broken away view of a perch or a base-strip in longitudinal section. Fig. 3 is a side view of the same. Fig. 4 shows an end view of a perch and a side view of a base-plate. Fig. 5 is a view of a perch or base-plate in transverse section.

Referring now to the drawing, the poultry roost consists, in part, of sills or base-strips 6 preferably supported upon legs 7, but which may, if desired, have any other suitable support. Numerals 8 indicate perches which are disposed upon the sills or base-plates 6, transversely thereof, notches or recesses $a$ preferably being formed in the sills for receiving the perches.

Since the base-plates and the perches are practically of the same construction, it is considered that a detailed description of the perches alone will be sufficient, it being understood that the elements indicated by reference characters for the perches 8 may be used in connection with and will be equally applicable for the base-plates or sills 6.

Each base-plate 6 and perch 8 is preferably constructed of wood, and they may have any suitable length. Preferably they have a form rectangular in cross-section, except that they should be formed convexed at the top.

In order that the perches and base-plates may be medicinally or chemically treated and that a liquid mixture may permeate the wood fiber and may be conducted to the uppermost parts of each convexed surface $b$, I provide reservoirs 9 adjacent to the ends and which open on the top of each, and provide a channel 10 midway between the sides, said channel being in communication with the reservoirs, and also form a slot 11 midway between the sides of each perch and sill in communication with the reservoirs thereof, each slot opening on the convexed surface $b$ and communicating with a channel.

Numerals 12 indicate filler-strips which are disposed in the slots, their upper edges terminating at the top of said perches and base-plates, the lower edges of said filler-strips terminating adjacent to the bottoms of said channels.

As thus described, attenuated passageways 13 will be formed between the sides of the filler-strips and walls of the slots 11, as best shown in Fig. 5 of the drawing, and it will be understood that the liquid which may be poured into, and which may be contained in the reservoirs 9, may move into the channels 10, and by capillary attraction may move upwardly to be discharged at the uppermost parts of the curved surfaces $b$ of the perches and base-plates.

Numerals 14 indicate grooves which are formed in the sides, and numerals 15 indicate grooves which are formed in the ends of the perches and base-plates, the grooves 14 and 15 for each perch and base-plate being in communication, and since these grooves extend inwardly with a downward inclination they provide conduits, and since these conduits are in communication with the reservoirs 9, as by use of passageways 16, the liquid mixture may move to said conduits from the reservoirs, and as thus described, all of these conduits, as well as the channel 10, together with the passageways 13 and 16, are in communication with the reservoirs 9 for each base-plate 6 and perch 8.

Since the perches are seated in the notches or recesses $a$, they will engage only those parts of the sills or base-plates immediately above the conduits 14 thereof, and it is considered that vermin moving upwardly from the ground would not pass the last named conduits and would not ordinarily reach the perches or sills. Since the sills 6 are adapted to be used as perches by the poultry, their construction should be practically the same as for members 8, and on account of the construction as described it is considered that vermin will be excluded from any part of the roost. Since the legs 7 are secured to parts of the sills below the conduits 14 and 15 any liability of vermin moving to members 6 and 8 from the legs will be reduced to a minimum.

It will be noted that the filler-strips 12 project downwardly into the channels 10 which facilitates a movement of the liquid to the upper, curved surfaces of members 6 and 8, through the passageways 13.

The sills 6 with their legs 7, as described, provide a convenient and practical support for the perches 8, but it is obvious that the sills could be dispensed with, and that the perches could be supported by other means, and therefore I do not wish to limit myself to the use of the sills 6.

I claim as my invention,—

In a poultry roost, a plurality of strips, a plurality of sills disposed below and having notches for receiving said strips, each strip and sill being provided with reservoirs near its ends for containing a liquid mixture and having a channel extending longitudinally thereof in communication with the reservoirs, and communicating grooves opening on its sides and ends in communication with the reservoirs.

In testimony whereof, I have affixed my signature.

CLARENCE A. SKINNER.